July 31, 1962 F. FRÜNGEL 3,047,701
DEVICE FOR HEATING A GROUND COVERING
Filed May 13, 1960
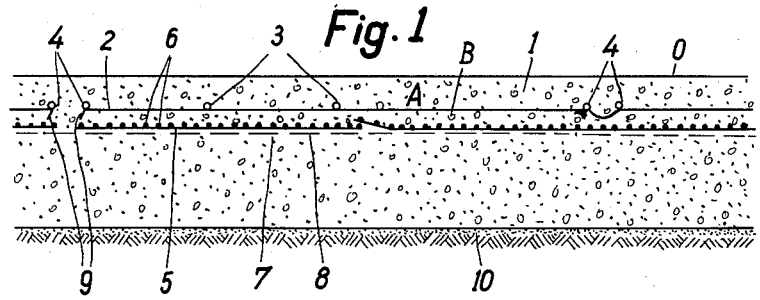
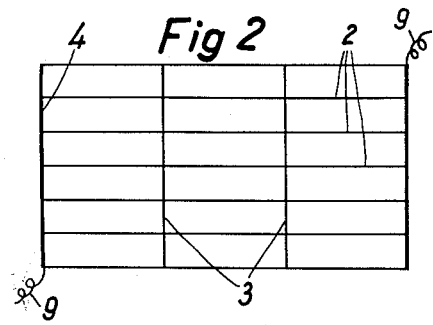
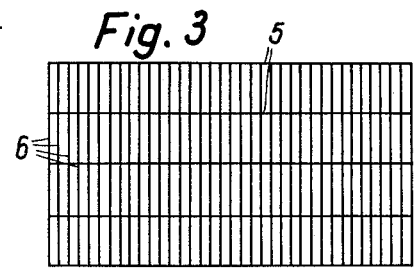
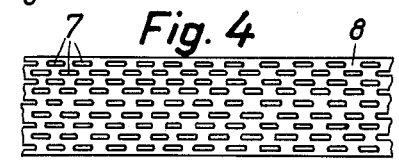
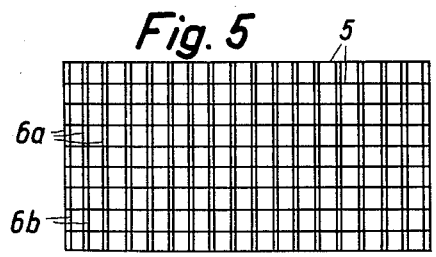
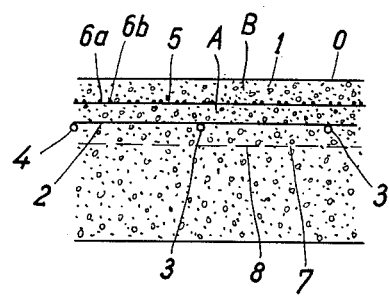

United States Patent Office 3,047,701
Patented July 31, 1962

3,047,701
DEVICE FOR HEATING A GROUND COVERING
Frank Früngel, Wittenbergenes Weg 79,
Hamburg-Rissen, Germany
Filed May 13, 1960, Ser. No. 29,084
Claims priority, application Germany Mar. 3, 1960
14 Claims. (Cl. 219—19)

This invention relates to devices for heating ground coverings such as, for example, the covering of a street, an airport, or a bridge. The ground covering for which the invention is to be particularly used is concrete, but the device can also be used for other ground coverings.

Methods of heating ground coverings are known. It has, for example, been proposed to embed wires in the ground covering of a street, which wires are heated by means of a current passed through the wires. In several of these cases, the heating wires were provided with an electrically insulating sheathing. In some cases, the heating wires were connected to a steel reinforcement provided in the ground covering, said steel reinforcement consisting of a mat of interlinking steel wires connected to each other at the points of intersection. In other cases, pipes were laid in the ground covering for heating same, and the interiors of said pipes were heated, for example, by electrically insulated heating wires in said pipes.

The invention contemplates a device for heating ground coverings, which device is inexpensive, easy to lay, substantially not susceptible to failure, and easy to repair if necessary.

In heating devices for ground coverings which consist of a number of parallel heating means such as wires, said wires have been placed in comparatively close juxtaposition in order to obtain a sufficiently uniform heating of the surface. It has been considered expedient to keep the distance between the heating elements at approximately the amount by which the heating element is spaced from the surface of the covering. If the distance of the heating elements relatively to each other is greater than their distance from the surface, the heating of the surface of the ground covering becomes more irregular. On the other hand, the close arrangement of heating elements is comparatively expensive. It is an object of the invention to provide a way of overcoming this dilemma.

The invention thus relates to devices, arrangements, and systems for heating a ground covering, wherein heating elements, for example, electrically heated wires are spaced in a ground covering, and particularly in an area parallel to the surface of the ground covering. According to the invention, elements, interconnected so as to conduct heat well and composed of a material having substantially greater specific thermal conductivity than the ground covering, are distributed in another area parallel to the surface of the ground covering at a density which is greater than the density in which the heating elements are distributed in their plane. The distance of the heating elements relatively to each other may be a multiple, preferably 3 to 10 times, of the distance separating the area in which they are located from the ground covering. The elements arranged underneath the heating elements according to the invention cause a comparative homogeneity in the heating of the surface of the ground covering. Said elements are composed preferably of parallel metal wires which are arranged in intersecting groups and which are interconnected for heat conduction at their points of intersection. The elements may also have the form of a metal plate provided with slots, so that the webs between the slots correspond to said elements. Expanded metal may, for example, be used as such a metal plate.

If the elements used for the equalizing of the heat introduced into the ground covering by the heating elements are intersecting groups of metal wires—metal wires in this connection means elongated metal members of any desired cross section, i.e. including steel strips or bands— it is advisable to keep the distance of said wires smaller than the distance of the heating elements with respect to each other. If said wires are arranged periodically more densely and less densely, it is advisable to see to it that the average distance of said wires is smaller than the distance if the heating elements with respect to each other.

In such cases, the elements thus form a mat made of wires. Said mat will be called a "temperature equalizing mat" or, briefly, an "equalizing mat" hereinafter. The distance of the equalizing mat from the surface of the ground covering is preferably approximately twice the average distance of the mat from the heating elements of the mat with respect to each other; the distance of the mat from the heating elements is preferably smaller than the distance of the heating elements from the surface of the ground covering; it may be of the order of magnitude of 1 cm.

In order to obtain a good heat equalization by the equalizing mat, it is advisable to arrange its elements so closely that the thermal conductivity of any mat section is at least equal to the conductivity of the ground covering located above said mat section. It is to be observed that the thermal conductivity of the elements of the mat, if they are made of iron, is about 80 times that of concrete.

A substantial improvement of the equalizing moderation of the distribution of heat can be obtained in that pieces of a foil are arranged in the ground covering underneath said elements, said foil being adapted to reflect upwardly the heat impinging on it from above.

The invention is illustrated, by way of example, in the accompanying drawing, in which—

FIG. 1 shows a longitudinal section through a concrete covering for a roadway according to the invention;

FIGS. 2 to 4 each show a top view of separate portions of the device shown in FIG. 1, namely: FIG. 2, the heating device, FIG. 3, the heat equalizing device, FIG. 4, the reflecting foil;

FIG. 5 shows another embodiment of the heat equalizing device;

FIG. 6 shows another embodiment of the reflecting foil;

FIG. 7 shows another arrangement of the device according to the invention.

Referring now to FIG. 1, 1 is the concrete plate serving as ground covering, and embedded therein in three subjacent planes parallel to the surface O of the concrete are: a heating device A, composed of a group of parallel steel wires 2 and a group of wires 3 and 4 intersecting the first said group at right angles (see FIG. 2), said wires 3 and 4 being connected to the steel wires 2 by spot welding; a mat B composed of wires 5 and 6 also intersecting at right angles and interconnected by spot welding (see FIG. 3); an aluminum foil 8 provided with holes 7 (see FIG. 4).

The size and details of the mat A serving as heating device depend on the requirements of each particular case such as, for example, the overall area and width of the ground covering to be heated, thermal efficiency, uniformity of the heating, voltage and kind of the material of the mat and of the ground covering.

For example, if the heating mat A is laid in a plane 4 cm. beneath the concrete surface O, and if it is composed of longitudinal wires or heating elements 2 of steel 3 meters long and 2 mm. thick with a specific electric resistance of 0.5 ohm/mm., and of transverse wires or heating element 3 of ordinary steel 1.5 meters long and 3 mm. thick with a specific resistivity of 0.15 ohm/mm., a transverse wire 4 of copper 10 mm. thick is provided at each end. The transverse wires 3 and 4 are connected to the longitudinal wires 2 at all intersection points by spot welding. This manner of welding makes it possible to weld wires of different metals unobjectionably and in such a manner that the resistance of the welded connection is as low as possible.

In any case, said resistance must not be greater than the resistance of the interconnected wires. The term spot welding refers to an electric resistance welding, in which a heat sufficient for melting the metals is fed to the place of welding for the duration of a few milliseconds by a transformed capacitator discharge impulse.

The wires 4 used at the ends may also be steel wires. In any case, the resistance of the wires 4 is not to be greater than the total resistance of the longitudinal wires 2 connected parallel to each other. It is further advisable to select the strength of said wires 4 so that they do not permanently deform when the mat is being laid. Said wires 4, together with the longitudinal wires 2, then substantially insure the mechanical stability of the mat during transportation and during laying.

Transverse wires 3 of iron or of another suitable metal may be provided between the end wires 4, the metal in question being one that conducts better than iron, e.g., aluminum or copper or alloys of these metals.

The wires 2, 3 and 4 may be of any length desired including a length causing the mat to have a square shape.

The heating mats composed of the wires 2, 3 and 4 are arranged successively (or possibly juxtaposed in a plane) as shown in FIG. 1. They can be prevented from adhering to the ground covering by a thin layer of material such as silicone oil which does not substantially reduce heat conduction. Welded to the wires 4 are connecting wires 9 which are either connected to the wire 9 or 4 of the next mat or through the concrete 1 to a power source such as, for example, a transformer (not shown).

FIG. 1 shows in a horizontal plane located about 3 cm. below the heating mat, the temperature equalizing mats B, each of which is composed, as shown in FIG. 3, of a number of longitudinal wires or heat equalizing elements 5 and of a number of transverse wires or heat equalizing elements 6 which are interconnected at their points of intersection by spot welding. The length of the wires 5 and 6 may substantially coincide with the length of the longitudinal and transverse wires of the heating mats, but it may differ therefrom considerably.

It is the purpose of these mats B to distribute more uniformly the heat which is introduced into the concrete 1 by the heating mat A and which is irregularly distributed owing to the distances between the wires of the heating mat. Accordingly, the mat B is constructed in such a manner that any group of longitudinal and transverse wires 5, 6 has a thermal conductivity which is at least equal to the thermal conductivity of the portion of the ground covering located above it. If a steel plate were used as a mat instead of wires, it would be very easy to calculate that the depth of said steel plate should be at least about $\frac{1}{80}$ of the height of the concrete layer above the steel plate, since the thermal conductivity of steel is 80 times that of concrete. If, according to the above description, the steel plate is located 70 mm. below the surface of the concrete, it would be advisable to use a steel plate of 1 mm. thickness. Actually, however, if steel plate were to be used as the heat equalizing mat, said steel plate would have to be provided with many openings so as to permit the setting of the concrete through the same. It would be easy to determine what strength of steel plate would have to be used, since the steel plate used must have the same weight as the steel plate calculated according to the above statements. Accordingly, the mat composed of steel wires would have to have the same weight as a steel plate of 1 mm. thickness.

The above calculation for the equalizing mat is applicable for the case where there is no reflecting foil 8. Starting from the theoretical case where a reflecting foil is used which reflects all heat impinging on it, it would be sufficient to use half the material for the equalizing mat. In many cases, it would be advisable slightly to exceed the calculated values to be on the safe side. The foil 8 may be an aluminum foil, either a foil with sufficiently large holes to permit the concrete to set therethrough or else separate aluminum strips having an area of the order of magnitude of one or a few square centimeters which are embedded in the concrete. The plane in which the aluminum foil is placed is preferably only slightly below the mat A and/or B, for example, 5 mm. below the same. The foil is polished at least on the reflecting side, and its underside may be provided with a covering which largely prevents loss of heat in upward direction. For example, a smooth foil may be covered with paper on its underside, or else, paper may be arranged between two aluminum foils. It is advisable, and especially so if no reflecting foil is used, to insulate the ground covering on its underside with respect to the supporting ground. If concrete slabs are used as ground covering, the insulation which is used for insulating such slabs is frequently sufficient for this purpose.

As a specific example, 40 mm. below the surface of the concrete slab which serves as the ground covering, is provided a heating mat A of wires 3 meters long and 2 mm. thick of a stainless refined steel, which wires are spaced at a distance of 200 mm. These wires 2 (see FIG. 2) are interconnected at their ends by a transverse wire 4 which is 1.5 meters long and 5 mm. thick, and are otherwise connected by transverse wires 3 made of a 1 mm. copper wire and spaced at 500 mm. The lead-out wires 9 are located at opposite corners of said mat. The heating mat is supplied through the lead-out wires with electric current, the wattage of which amounts to 360 watts (120 watts per meter) until a sufficient heat effect is apparent on the concrete surface; after the initial heating period, the wattage is reduced to one-fourth of its starting magnitude. 30 mm. below said heating mat A is the mat B (see FIG. 3) for heat equalization, which is composed of longitudinal wires 3 meters long and 5 mm. thick, and of transverse wires 6, which are also 5 mm. thick, but only 1.50 meters long. Both wires 5 and 6 are made of ordinary iron wires. The distance between the transverse wires is 50 mm. The distance between the longitudinal wires is 300 mm. Thus, the heating effect is caused substantially by the transverse wires 6, i.e., the wires lying transversely with respect to the heating wires 2.

At a distance of 50 mm. below the mat B is a foil 8 made of aluminum, as shown in FIG. 4. The foil comprises holes 7, so that the concrete is able to set through the foil and is thus not substantially impaired in its strength by the embedded foil. Instead of using the foil 8, it is possible to embed in the concrete smaller foil strips 8a, which have a length of, for example, 100 mm. and a width of 20 mm. (see FIG. 6).

Between the concrete slab 1 and the ground is a heat insulation consisting, for example, of a mat made of straw or paper.

The heat equalizing mat may be so developed that it is simultaneously capable of absorbing the tensile stresses to which the concrete is exposed, and for the absorption of which the concrete is usually provided with reinforcements.

FIG. 5 shows another form of a heat equalizing mat. This mat differs from the mat shown in FIG. 3 substantially in that, instead of separate wires 6 having a diameter of 5 mm. and spaced at 50 mm., wires 6a and 6b are arranged in pairs at a distance of 60 mm. from each other, the individual wires having a diameter of 4 mm., and the wires 6a and 6b being in close juxtaposition. If a foil 8 is used, the thickness of the wires 6a and 6b may be reduced to 3 mm.

The heat equalizing device, instead of being composed of a mat of wires welded together, such as shown, for example, in FIGS. 3 and 5, may consist of a perforated plate such as, for example, a plate which has the same shape as the foil 8 shown in FIG. 4. Given the same conditions, such a plate, in which the holes occupy ⅓ of the surface, may have a depth of 0.6 mm. If the plate is made of aluminum, a thickness of 0.2 mm. would be sufficient; in case of copper plate, a thickness of 0.12 mm. will suffice.

If a plate is arranged underneath the heating device A as a heat equalizing device, it is advisable to provide the underside of the plate with a covering which is a poor heat conductor.

Instead of perforated plates, expanded metal or lattice constructions of various kinds may also be used.

FIG. 7 shows an arrangement of heating device A and heat equalizing device B, which differ from those shown in FIG. 1 mainly in that the equalizing device B is located above the heating device A. In this case, the use of a foil 8 is especially appropriate.

The heat equalizing mats in FIGS. 3 and 5 are always shown in such a manner that the wires 6 or 6a and 6b, which are decisive for the equalization of heat, are at right angles to the heating wires 2. Such an arrangement is the most appropriate one. But it is also possible to arrange these wires 6 or 6a and 6b at another angle transersely to the heating wires 2.

In the interest of the equalizing moderation of the heating, it may be advisable to insert the lead-out wires for the electric current at two places which are diametrically opposite the heating mat. The lead-out wires 9 in FIG. 2 are disposed accordingly. Successively arranged heating mats can be electrically connected to each simply with adjacent corners connected to each other by a short conducting piece 9. In order to be able to reduce the heating power for the heating mat without difficulty to ¼ of its value after the initial heating has been effected, it is advisable to connect the mats of a group of 4 mats to the electric source so that a group of four mats can selectively be connected in series and parallel by means of a switch.

What is claimed is:

1. Apparatus for heating a ground covering having a surface, said apparatus comprising spaced heating elements in the ground covering in a plane parallel to the surface of the ground covering, heat equalizing elements in the ground covering and interconnected for efficient heat conduction, said heat equalizing elements being of a metal having a substantially greater thermal conductivity than the ground covering and being distributed in a second plane parallel to the surface of the ground covering with a density which is greater than the density with which the heating elements are distributed in the first said plane to provide for equalized heat distribution, said heating element being constituted by two groups of rectangularly intersecting metal wires fixed together at their intersections, the wires of one group having a higher electric resistance than the wires of the other group and the wires of the first said group being longer than the wires of the other group and being adapted for connection to a source of electrical energy and pieces of foil located in the ground covering underneath the heating elements and the heat equalizing elements, said foil being adapted to reflect upwardly the heat impinging on it from above.

2. Apparatus according to claim 1, wherein the two outermost metal wires of the one group of the heating element have an electric resistance which is at most equal to the total resistance of the wires of the other group which are connected in parallel and comprising lead-in wires for the supply of electric current to the wires of said other group.

3. Apparatus for heating a concrete ground covering having a surface, said apparatus comprising spaced heating elements in the ground covering in a plane parallel to the surface of the ground covering, heat equalizing elements in the ground covering and interconnected for efficient heat conduction, said heat equalizing elements being of a metal having a substantially greater thermal conductivity than the ground covering and being distributed in a second plane parallel to the surface of the ground covering with a density which is greater than the density with which the heating elements are distributed in the first said plane to provide for equalized heat distribution, said heating element being constituted by two groups of rectangularly intersecting metal wires fixed together at their intersections, the wires of one group having a higher electric resistance than the wires of the other group and the wires of the first said group being longer than the wires of the other group and being adapted for connection to a source of electrical energy and a layer of material surrounding the wires constituting the heating elements for preventing adhesion of concrete and wires, said layer being relatively thin so that the said material does not substantially reduce the conduction of heat between wire and concrete.

4. Apparatus according to claim 3, wherein said layer is silicone oil.

5. Apparatus for heating and reinforcing a concrete road having a surface, the apparatus comprising: a planar heating mat in said road, said heating mat being constituted by two groups of wires coupled together, one group including heating wires of high electrical resistance arranged parallel to one another and adapted for being connected to a source of electrical energy, the other group including wires of sufficient rigidity to prevent residual deformation of the heating mat from its own weight, and a mat of reinforcement rods in said road parallel to said heating mat and spaced therefrom, said rods of said mat being resistant to tensile stresses whereby they reinforce the concrete road, said heating wires being spaced from one another a distance which is a multiple of the distance of the heating mat from the surface of the road, said rods of the reinforcement mat being spaced in one direction a distance which is less than the spacing of the heating wires, said mat of reinforcement rods being spaced from the heating mat a distance which is less than the distance of the heating mat from the surface of the road.

6. Apparatus as claimed in claim 5 wherein the wires of the other group are of commercial steel and said heating wires are of a steel alloy having substantially greater electrical resistance than commercial steel.

7. Apparatus as claimed in claim 5 wherein the spacing of the heating wires is between about 3 to 10 times their distance from said surface of the road.

8. Apparatus as claimed in claim 5 wherein the reinforcement mat is located between the heating mat and the road surface.

9. Apparatus as claimed in claim 5 wherein the groups of wires in the heating mat are adapted for being coupled together by electrical impulse welding.

10. Apparatus as claimed in claim 5 wherein said reinforcement mat is constituted by a steel sheet having slits therein whereby forming said rods.

11. Apparatus as claimed in claim 5 wherein said rods of the reinforcement mat are of heat conducting material, said rods being densely distributed so that the heat conduction of the reinforcement mat is at least as great as the heat conduction of the concrete above the mat.

12. Apparatus as claimed in claim 5 comprising pieces of foil located in the concrete beneath the reinforcement mat for upwardly reflecting heat.

13. Apparatus as claimed in claim 5 comprising a layer of material surrounding the heating wires and preventing adhesion of the concrete and the heating wires, said layer being relatively thin so that the material does not substantially reduce the conduction of heat between the heating wires and the concrete.

14. Apparatus as claimed in claim 13 wherein said layer is silicone oil.

References Cited in the file of this patent

UNITED STATES PATENTS

| | | |
|---|---|---|
| 1,349,136 | Lillard | Aug. 10, 1920 |
| 1,742,159 | Hynes | Dec. 31, 1929 |
| 2,138,217 | Sutter | Nov. 29, 1938 |
| 2,634,361 | Reynolds | Apr. 7, 1953 |
| 2,866,066 | Neely | Dec. 23, 1958 |

FOREIGN PATENTS

| | | |
|---|---|---|
| 113,192 | Australia | May 27, 1941 |